United States Patent [19]

Steele et al.

[11] 3,955,413
[45] May 11, 1976

[54] ELECTRICAL SYSTEM FOR ELECTROMAGNETICALLY MEASURING FLOW OF FLUID

[76] Inventors: James R. Steele, 16261 Itasca St., Sepulveda, Calif. 91343; James Susumi Imai, 2801 Sixth Ave., Los Angeles, Calif. 90018

[22] Filed: Mar. 27, 1974

[21] Appl. No.: 455,196

[52] U.S. Cl. .......................................... 73/194 EM
[51] Int. Cl.² .......................................... G01F 1/58
[58] Field of Search .............................. 73/194 EM

[56] References Cited
UNITED STATES PATENTS

| | | | |
|---|---|---|---|
| 3,550,446 | 12/1970 | Tucker et al. | 73/194 EM |
| 3,783,687 | 1/1974 | Mannherz et al. | 73/194 EM |

*Primary Examiner*—Charles A. Ruehl
*Attorney, Agent, or Firm*—Edward H. Loveman

[57] ABSTRACT

An electrical system for measuring the speed of flow in a body of a fluid includes a current generator for energizing a coil and establishing a magnetic field in the body of the fluid. A current switching circuit connected between the current generator and the coil, cyclically reverses direction of current flow through the coil to reverse the magnetic field. The switching circuit includes energy storage capacitors for storing energy released by the coil during one half of each cycle and for returning the stored energy to the coil during the next half cycle. A control pulse generator supplies control pulses for cyclically controlling the reversal of current flow and the storage and release of energy in the capacitors.

9 Claims, 7 Drawing Figures

ELECTRICAL SYSTEM FOR ELECTROMAGNETICALLY MEASURING FLOW OF FLUID

This invention relates to the art of electrical measuring systems, and more particularly concerns an electrical measuring system for an electromagnetic flow meter which employs a novel power supply.

Electromagnetic flow meters which are used to measure the flow of a liquid in a conduit, such as blood, in a blood vessel, generally employ a probe including electrodes which contact the liquid flowing in the conduit see for example Alexander Kolin U.S. Pat. No. 3,757,773 entitled "External Field Electromagnetic Flow Sensor-Artery", which issued on Sept. 11, 1973. An electromotive force or voltage is developed across the electrodes due to the flowing liquid and is measured by the flow meter. Since this voltage is proportional to the velocity of the liquid, the flow meter may be directly calibrated in units of rate or volume of flow.

The signal voltages, which the electromagnetic flow meters of the type described must measure, are of a very low level or magnitude and often they are masked by both D. C. polarization voltages and other spurious or undesired signals caused by Eddy Currents and stray EMF's. When the amplitudes of the masking signals approach those of the signals to be measured, the conventional flow meters provide unreliable measurements or readings.

The present invention is directed at solving this and related problems encountered with prior art flow meters. According to the invention, there is provided a novel electromagnetic flow meter including a current generator circuit electrically exciting a coil which may be used in a flow meter probe. The current generator cyclically conducts a constant current ($dI/dT = 0$) to the coil. During the time the current is constant a magnetic field which surrounds the coil is constant ($dB/dT = 0$). The spurious induced EMF's are proportional to changes in the magnetic field of the coil and thus when the magnetic field is constant ($dB/dT - 0$) the spurious induced EMF's are zero. Similarly undesired Eddy Currents quickly reduce to zero when the magnetic field is constant ($dB/dT = 0$). However, at this time, the signal being measured, which is proportional to the magnetic field of the coil, is at maximum value, and hence can be accurately measured by the system.

The system employs a unique amplifier for measuring this signal. This amplifier is unusual in that its input is switched "off" during the time that the generator current is changing and is turned "on" only when ($dB/dT = 0$). At the same time that the signal is switched "off", the gain of the amplifier is reduced in order to minimize feed-through of spurious current in the input switches.

Normally a reactive load stores energy in varying amounts depending on its Q or quality factor. Alternating the polarity or drive to such a reactive load generally requires the dissipation of the energy stored during each cycle. In the present invention, the energy stored in the flow meter coil which normally would have to be dissipated, is instead stored in another circuit and is delivered to the coil during the next half cycle when the reactive load is switched. Because the energy which would have been dissipated is being fully utilized, the peak power voltage and current requirements of the system are greatly reduced. As a consequence, the equipment may be considerably reduced in size and complexity and power is conserved.

As a specific example of the benefits obtained from this invention, consider an instance where the reactive load is an electromagnet in which a cyclic change of polarity occurs. According to the present invention, the system temporarily stores the energy resulting from switching polarity of the inductive load, in a complementary element, for example a capacitor, and utilizes this energy to aid in the drive requirements for the next half cycle. The net result in this example is that a power supply operating at 36 volts can supply one ampere of current to drive the load, as compared to a power supply which must operate at 800 volts in a conventional flow meter to provide one ampere of drive current. The difference between the energies utilized in the present system and in a conventional system, would largely be waste heat. By avoiding this energy waste, a flow meter may be constructed which is smaller, simpler, and more economical to construct and operate.

It is therefore, a principal object of the present invention to provide an improved economic electrical measuring system in which a low level electrical signal is to be measured that is proportional to the magnetic field of a coil but which signal is subject to being masked by both D. C. polarization voltages and undesired signals due to Eddy Currents and spurious induced voltages caused by changes in the magnetic field of the coil.

A further object of the present invention is to provide a measuring system as described, wherein the magnetic field change of the coil $dB/dT$ is equal to zero for some portion of the signal measuring period and wherein the polarity of the field is switched at a preselected rate.

These and other objects and many of the attendant advantages of this invention will be readily appreciated as the same becmes better understood by reference to the following detailed description when considered in connection with the accompanying drawings in which.

Figure 1:
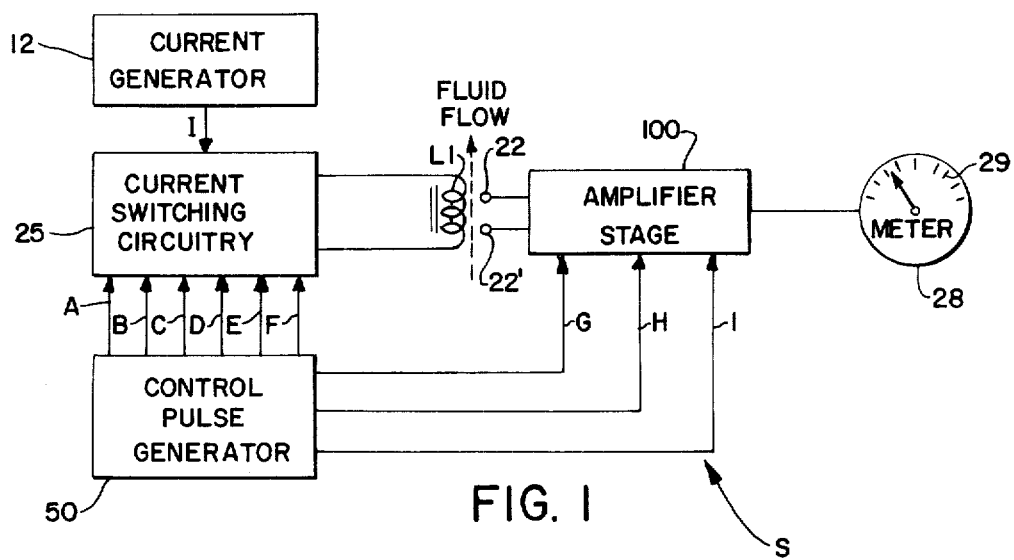
FIG. 1 is a block diagram of the overall fluid flow measuring system according to the present invention.
Figure 3:
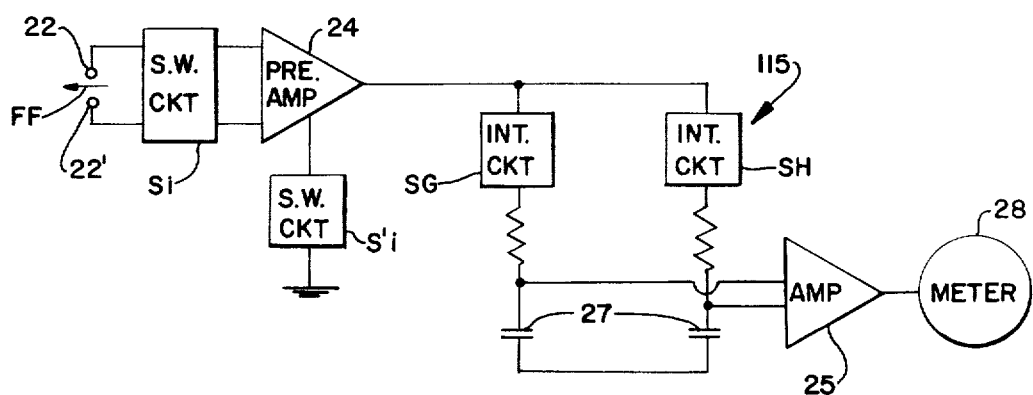
FIG. 3 is a block diagram of an amplifier circuit employed in the system.

Referring now to the drawings wherein like reference characters designate like or corresponding parts throughout, there is illustrated in FIG. 1 a fluid flow measuring system S including a current generator which supplies electric current I to an electromagnetic coil L1 via a current switching circuit 25. This circuit is actuated by control pulses A-F supplied by a control pulse generator 50. Disposed adjacent to the coil L1 in a stream of flowing fluid is a pair of spaced electrodes 22, 22' to pick up electrical signals. The electrodes 22 and 22', as illustrated in FIG. 3 are mounted at diametrically opposed points in a conduit (not illustrated) and they are not positioned as illustrated in FIG. 1, which is merely a block diagram of the electrical connections of the fluid measuring system. These electrodes are connected to the input of an amplifier circuit 100. A meter 28 having a scale 29 calibrated in rate of fluid flow units is connected to the output of the amplifier circuit 100. The control pulse generator 50 supplies pulses G, H and I for controlling operation of the amplifier circuit 100. The magnetic field is established by the current which flows through the coil L1 as directed by the control pulse generator 50. The magnitude of voltage induced in the electrodes 22, 22' is proportional to the rate of fluid flow. The electrical signals picked up by the electrodes 22, 22' after detection and amplification are fed to a meter 28 to provide the desired measurement of rate of fluid flow.

Figure 2:
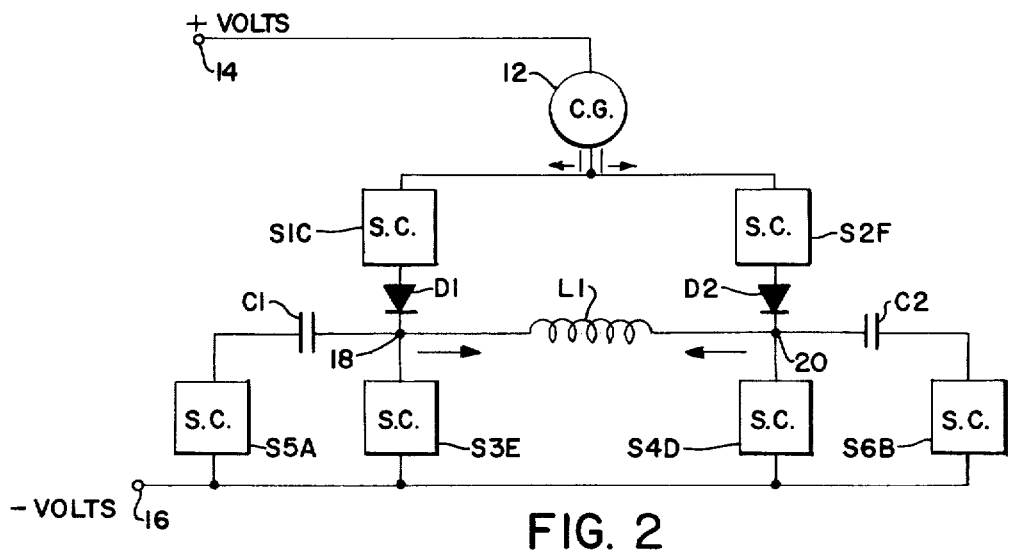
FIG. 2 is a block diagram of a current generator and a switching circuit employed in the system.

In FIG. 2, a current generator (C.G.) 12 is connected in circuit with respective positive and negative terminals 14, 16 from a low voltage D. C. source. The current generator 12 is connected in series with a switching circuit S1C and a rectifier diode D1 to a junction point 18 at one end of a coil L1. The coil L1 may be located in a probe which is inserted in a liquid stream whose flow rate is to be measured by the system. Current I flowing through the coil L1 creates a magnetic field and induces a voltage in the electrodes 22, 22' the magnitude of which is affected by the flowing current of liquid. The current generator 12 is also connected in series with a switching circuit S2F and a rectifier diode D2 to a junction point 20 at the other end of the coil L1. By this arrangement depending on which one of switching circuits S1C or S2F are conductive, current I passes in one direction or the other through the coil L1. By closing these switching circuits alternately, the direction of the current flow is reversed and the polarity of the external magnetic field around the coil L1 is reversed. A pair of energy storage capacitors C1 and C2 are connected to the junction points 18 and 20 respectively. A switching circuit S5A is connected between the capacitor C1 and the terminal 16. Another switching circuit S3E is connected between the junction point 18 and the terminal 16. Still another switching circuit S4D is connected between the junction point 20 and the terminal 16. A further switching circuit S6B is connected between the capacitor C2 and the terminal 16. By means to be described below, the six switching circuits are cylically closed or turned on and opened or turned off, i.e. rendered conductive or nonconductive respectively.

Figure 4:
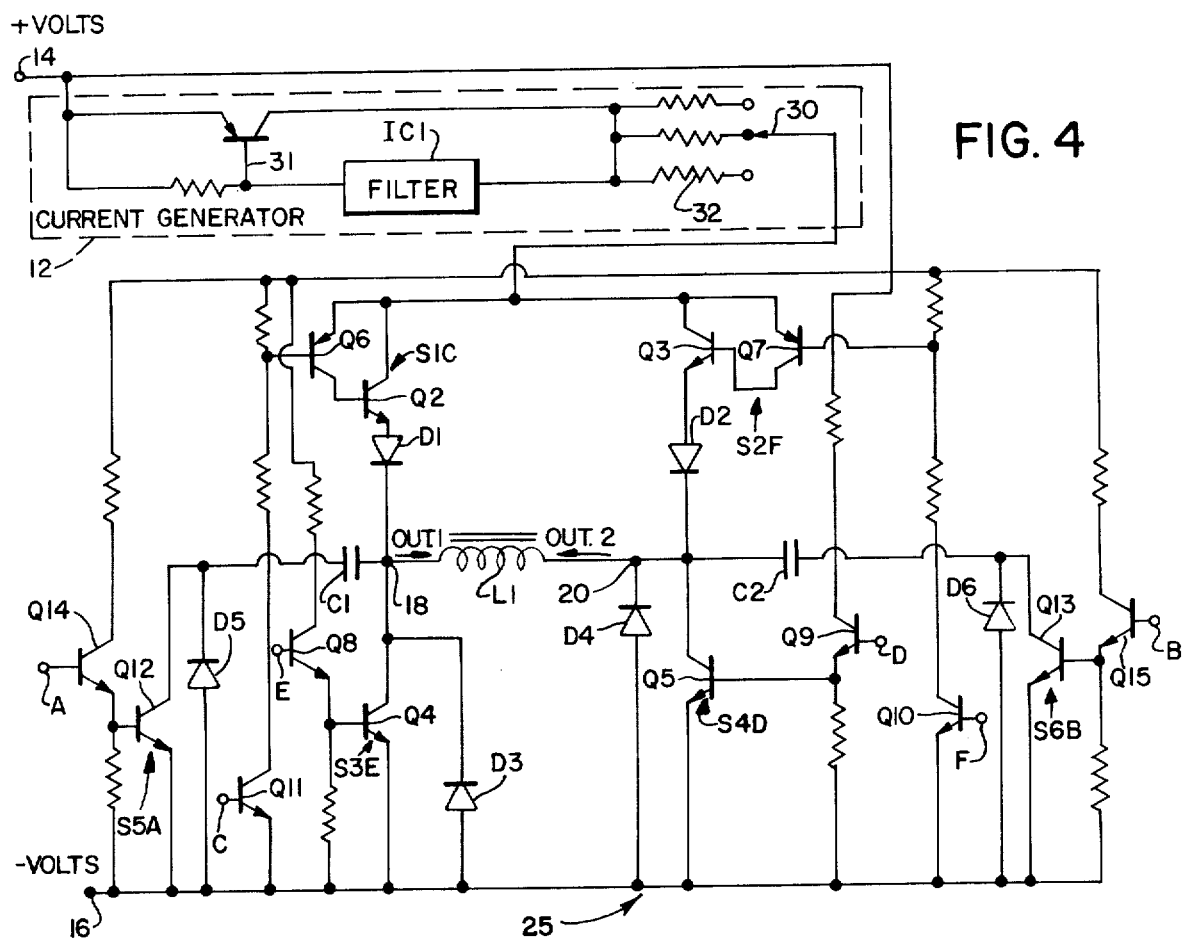
FIG. 4 is a schematic diagram of the current generator and the switching circuit.

FIG. 4 shows details of the reactive constant current generator 12 and the switching circuit 25 corresponding to the block diagram of FIG. 1. The current generator 12 is connected between the positive terminal 14 and the negative terminal 16 of the D. C. voltage source and is comprised of an IC1 (Integrated Circuit Voltage Regulator), a power transistor 31 and a plurality of parallel resistors 32. Current of a selected magnitude is taken from the switch 30 via any one of the resistors 32 each of which have different resistance values.

Figure 7:
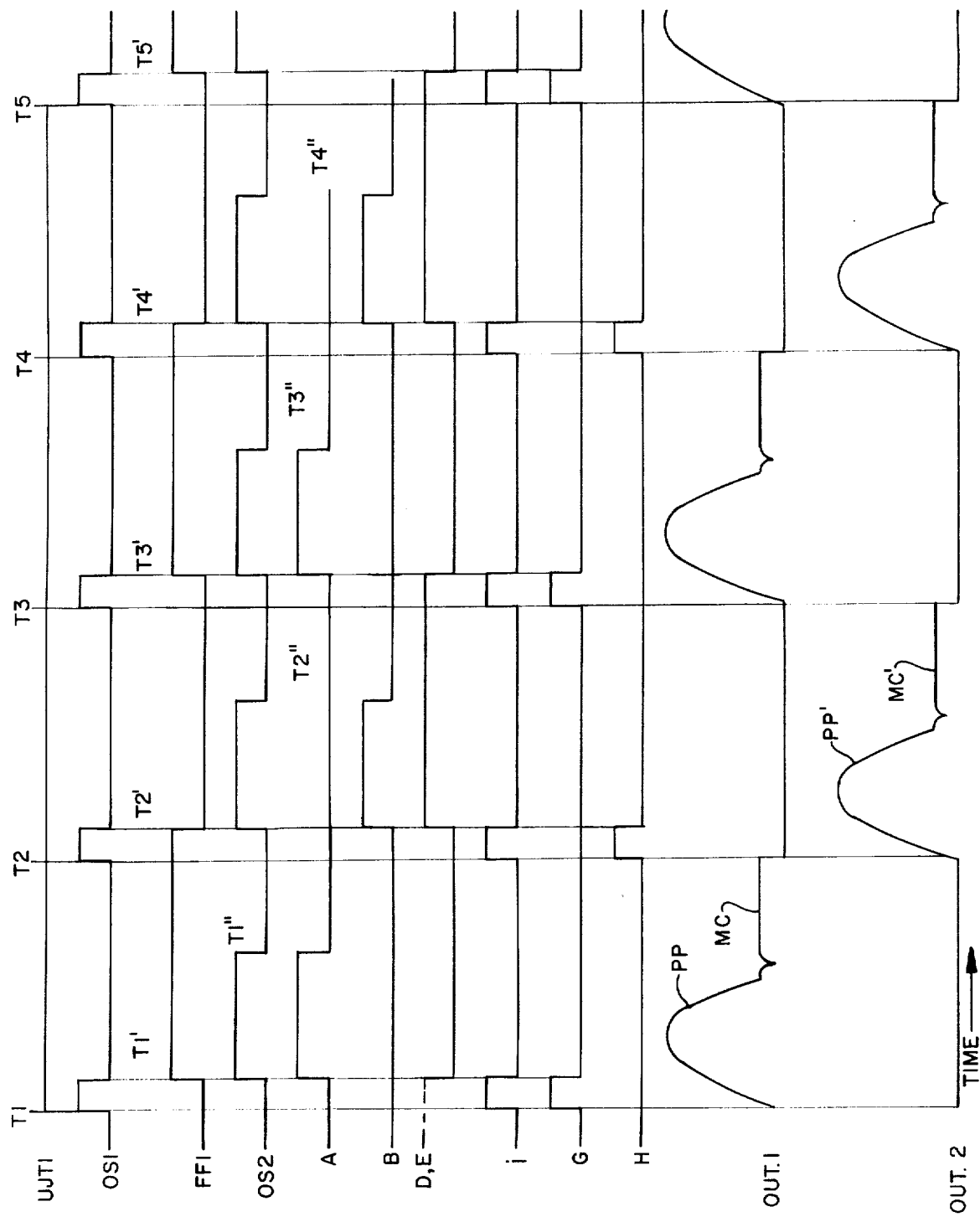
FIG. 7 is a timing and control pulse diagram used in explaining the invention.

A plurality of Transistors Q8, Q9, Q10, Q11, Q14 and Q15 serve as inputs for respective control pulses E, D, F, C A and B. These control pulses are shown graphically in FIG. 7 and will be described further below. A pair of transistors Q2 and Q6 are connected to the current generator 12 and constitute the switching circuit S1C. A pair of transistors Q3 and Q7 constitute the switching circuit S2F and are also connected to the current generator 12. The blocking diodes D1 and D2 are connected between the switching circuits S1C, S2F and opposite ends of the coil L1. A transistor Q12 and a diode D5 form part of the switching circuit S5A. A transistor Q4 and a diode D3 form part of the switching circuit S3E. A transistor Q5 and a diode D4 form part of the switching circuit S4D. A transistor Q13 and a diode D6 form part of the switching circuit S6B. The storage capacitors C1 and C2 are connected between opposite ends of the coil L1 at the junction points 18 and 20 where the drive voltage is illustrated as Out 1 and Out 2 and is obtained as the current is passed in opposite directions through the coil L1 (shown graphically in FIG. 7). In FIG. 7 it will be noted that after initial peak PP and PP' the voltage MC and MC' become constant across the coil L1 indicating that the current through the coil L1 is constant i.e. $DI/DT = 0$ and $DB/DT = 0$. Peaks PP and PP' occur alternately shortly after the start of respective alternate time periods T1, T2.

The block diagram of FIG. 3 shows the general arrangement by which the desired signal that is proportional to the fluid flow is measured. A pair of signal input terminals 22, 22' are connected via switching circuit Si to the input of a preamplifier 24. The preamplifier 24 is not responsive to D. C. signals, but only to signals having the same switching rate as that of the magnetic field of the coil L1. A switching circuit S'i is connected between the preamplifier 24 and ground. The input to the preamplifier 24 is switched off by a switching circuit Si during the time the current is changing and is turned on only when the rate of field change $dB/dT = 0$. At the same time that the input is switched off, the gain of the preamplifier 24 is reduced by the turning on of the switching circuit S'i. This minimizes the feed through of spurious currents to an output amplifier 25. The output of the preamplifier 24 is connected via a pair of phase sensitive integrator circuits SG and SH to the input of the output amplifier 25 which is a conventional high input impedance D. C. amplifier. The output of the amplifier 25 is connected to a meter 28.

The switching circuits Si and S'i are switched by application of switching pulses $i$ shown graphically in FIG. 7. These pulses are square wave pulses which occur at times T1-T5. The integrator circuit SG is controlled by pulses G occurring at times of alternate timing pulses T1, T3, T5, etc. whereas the integrator circuit SH is controlled by pulses H occuring at alternate pulse times T2, T4, etc. The pulses G and H are supplied by the switching and control circuit 50 to be described below. The integrator circuits SG and SH are switched on at the very end of the cycle when the signal is stored in the respective capacitor 27 (FIG. 3) before application to the output amplifier 25.

Figure 6:
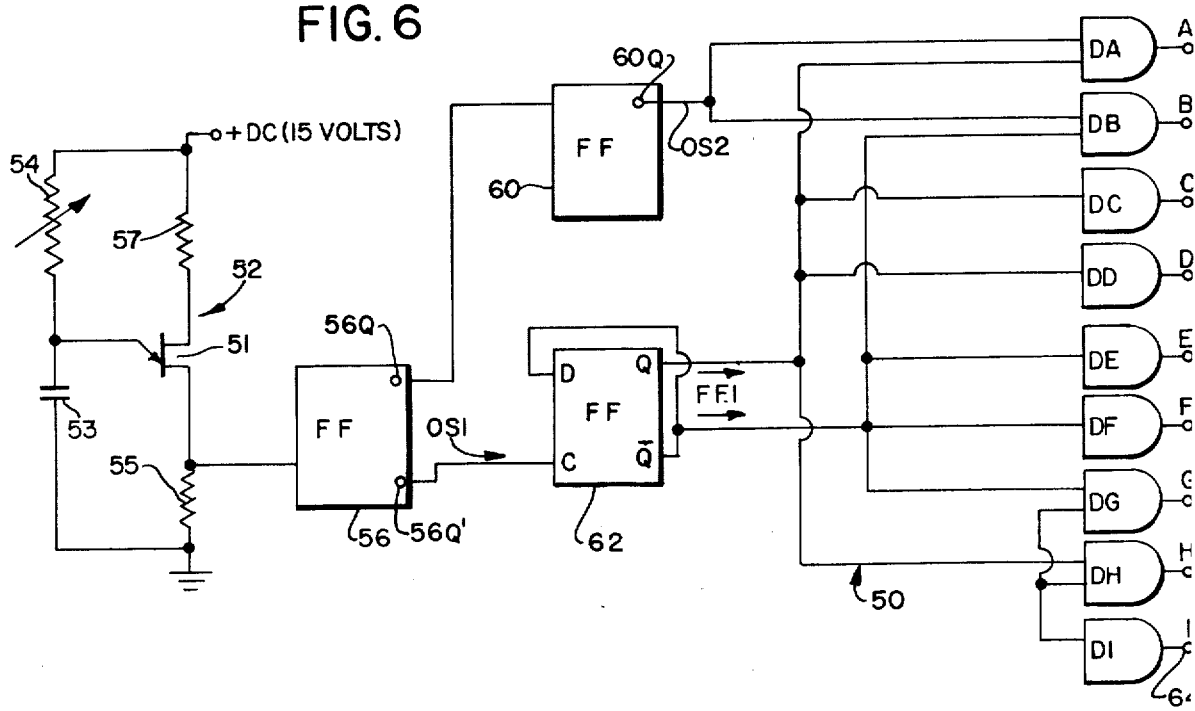
FIG. 6 is a diagram of a control pulse generator circuit.

The switching pulses A, B, D, E, G H and i which are shown graphically in FIG. 7 are generated by the the control pulse generator circuit 50 illustrated in FIG. 6. This circuit applies a plurality of switching pulses A through F to the switching circuits S5A, S6B, S1C, S4D, S3E and S2F respectively in FIG. 4. The circuit 50 has a timing circuit 52 which includes a unijunction transistor 51, a capacitor 53 and a plurality of resistors 54, 55, 57 to generate timing pulses UJT1 shown graphically in FIG. 7. The timing pulses UJT1 are spike pulses which occur at equally spaced time intervals at times T1-T5 and are applied to a flip-flop (FF) in a bistable circuit 56 which generates control pulses OS1 at output terminals 56Q and 56Q'. The pulses OS1 as shown in FIG. 6 are square pulses occuring at equally spaced times T1-T5. The flip-flop circuit 56 is connected to another flip-flop circuit 60 which generates a control pulse OS2 and appears at an output 60Q. The pulse OS2, as shown in FIG. 7, is triggered at times T1'–T5' at the ends of the pulses OS1 and extends for about half the time duration following times T1–T5. The pulses OS2 terminates at times T1''–T4''. A flip-flop circuit 62 is connected to the flip-flop circuit 56 and generates control pulses FF1 as shown in FIG. 7. The time duration of these pulses is from the end of each of the pulses OS1 to the end of the next pulse. The control pulses FF1 are applied to a plurality of gates DA-DI as shown in FIG. 6 and these gates in turn produce switching pulses A-H and $i$ at output terminals 64. The pulses A through F are applied to the switching circuits S5A, S6B, S1C, S4D, S3E and S2F shown in block diagram in FIG. 2 and in schematic diagram in FIG. 4 via transistors Q8, Q9, Q10, Q11, Q14 and Q15, as mentioned above. The switching pulses G and H are applied to the integrator circuits SG and SH, and the switching pulses $i$ are applied to both switching circuist Si and Si' of FIG. 3, as above mentioned.

Figure 5:
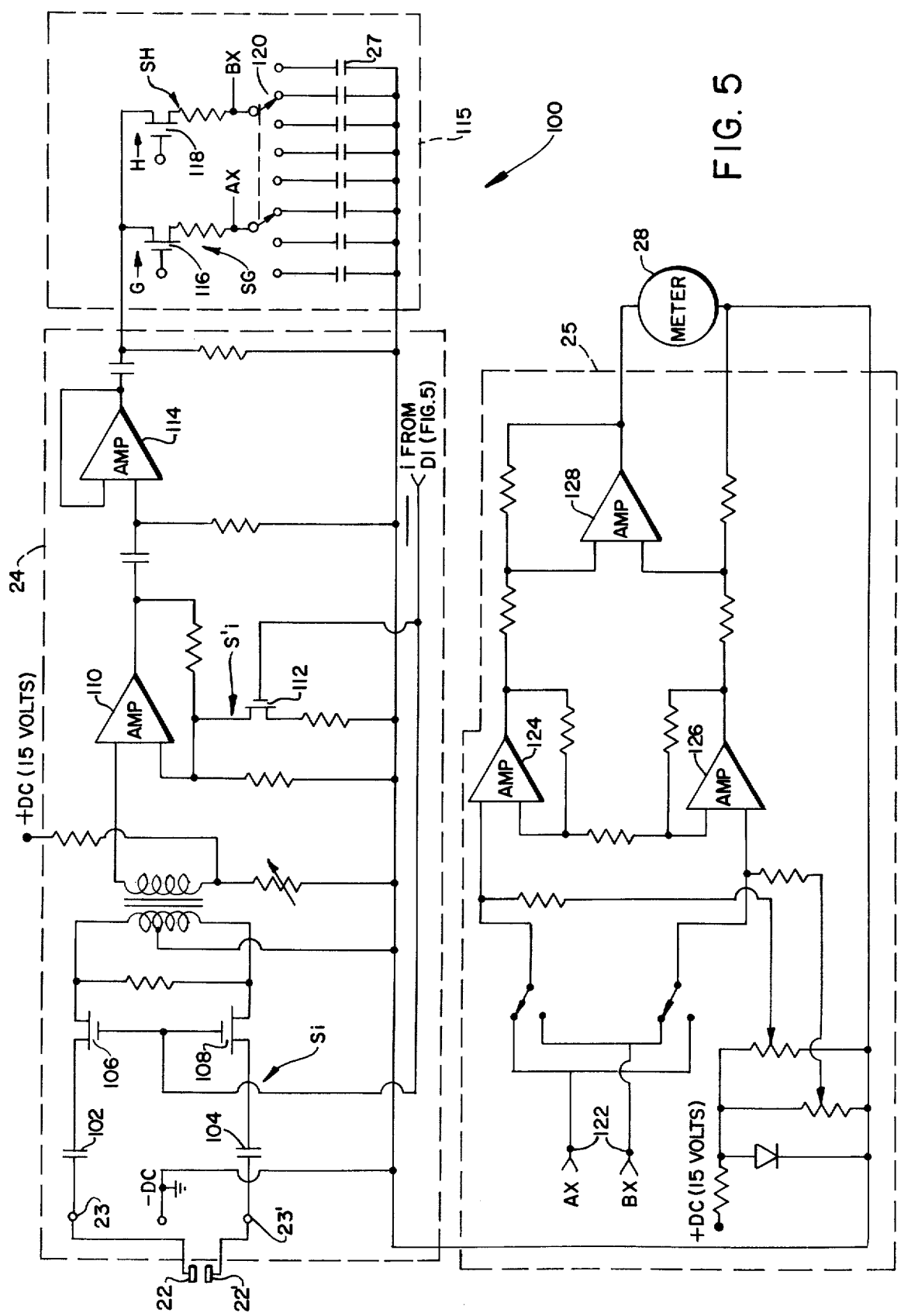
FIG. 5 is a schematic diagram of the amplifier circuit including preamplifier, detector and output amplifier sections.

FIG. 5 shows details of the preamplifier detection, and amplifier circuitry 100 shown in block form in FIG. 1. The signal input electrodes 22, 22' are connected to a pair of input terminals 23, 23'. A pair of capacitors 102 and 104 are connected between signal input terminals 23 and 23' and a pair of field effect switching transistors 106, 108 in the switching circuit Si. The control signal $i$ from the circuit 50 of FIG. 6 is applied to the switching transistors 106 and 108 for switching the input on and off to an amplifier 110. The input is turned on only when the magnetic field rate of change of the coil L1 (FIGS. 2 and 4) equals zero. The control signal $i$ is also applied to the amplifier 110 via a field effect transistor 112, in the switching circuits S'i to reduce the gain of the amplifier 110 when the amplifier input is turned off. The output of the amplifier 110 is applied to the input of an amplifier 114. The amplifiers 110 and 114 form part of the preamplifier 24 in the circuit 100. The output from the amplifier 114 is applied to the phase sensitive integrating circuits SG and SH which form parts of a detector section 115. This section also includes a pair of field effect transistors 116, 118 and a time constant determining switch 120 connected to the storage capacitors 27. The control pulses G and H derived from the control circuit 50 of FIG. 6 are applied to the transistors 116 and 118 respectively to switch the circuits SG and SH on at the end of each cycle when the signal is stored in the capacitor 27 before application to the amplifier 25. The output terminals AX and BX of the respective integrating circuits SG and SH are connected to the input terminals 122 of the amplifier 25 which includes a pair of amplifiers 124 and 126 and a driving amplifier 128 arranged as a high impedance amplifier. The output from the amplifier 128 is applied to a meter 28 which provides the desired signal measurement and may be calibrated in terms of the rate of flow of liquid being measured as above mentioned.

In operation of the system, timing pulses UJT1 shown in FIG. 7 are generated at equally spaced times T1–T5. Assume that during the time period T1 to T2, the switching circuits S1C and S4D shown in FIGS. 2 and 4 are turned on and the switching circuits S2F and S3E are turned off. The current generator 12 causes a direct current of constant magnitude to flow in the coil L1. At time T2, the switching circuits S1C and S4D are switched off and the switching circuits S2F, S3F and S6B are switched on. The magnetic field of the coil L1 will start to collapse. Current will then flow around the path of the coil L1, the switching circuits S3E, and S6B and the capacitor C2. The voltage at the junction 20 of the coil L1 and the capacitor C2 will be blocked by the diode D2 and will rise to a high potential. The current will drop to zero and change direction in the same path rising to nearly the same magnitude as before, since the circuit constitutes a damped oscillatory circuit. When the potential at the junction 20 of the coil L1 and the capacitor C2 falls to a point where the diode D2 conducts, the current generator 12 starts passing the current of the same magnitude as before through the coil L1, but now it is in the reverse direction. At the time that the current becomes constant in magnitude, the switching circuit S6B is switched off and the current path includes the positive voltage terminal 14, the current generator circuit 12, the switching circuit S2F, the coil L1, the switching circuit S3E and the negative terminal 16. At time T3, the cycle reverses with the switching circuits S1C, S4D and S5A switching on to store energy in the capacitor C1.

During the portion of the cycle when the current generator circuit 12 is conducting a current of constant magnitude, the external field of the coil L1 is constant in magnitude. The rate of current change $DI/DT$ is then zero, and the rate of magnetic field change $dB/dT$ is then also zero. Those undesired induced potentials which are proportional to $dB/dT$ then are also zero. Eddy Currents caused by such undesired potentials become zero after $dB/dT$ becomes zero. The desired signal to be measured will be maximum. This signal is proportional to the magnitude of the external field of the coil L1 and the rate of flow of the liquid stream where the coil is disposed as previously mentioned.

The present invention is especially applicable to measure rates of liquid flow in biological applications. It is however also applicable to measuring rates of flow in a conduit such as a water supply, sewer or the like. It can be used to measure flow of open water such as a canal or river. It can also be used to measure relative speed of a body moving in water such as a moving boat or the like.

It should be understood that the foregoing relates to only a preferred embodiment of the invention and that it is intended to cover all changes and modifications of the example of the invention herein chosen for the purposes of the disclosure, which do not constitute departures from the spirit and scope of the invention.

The invention claimed is:

1. An electrical system for measuring the speed of flow in a body of fluid comprising:
    an electric current generator;
    an electromagnetic coil disposable in said body of fluid for establishing a magnetic field therein;
    an electrode means disposed adjacent said coil for picking up desired electrical signals corresponding to changes in the speed of flow of said fluid;
    a current switching circuit connected in circuit between said current generator and said coil for cyclically reversing flow of current through said coil to reverse polarity of said magnetic field cyclically; said current switching circuit comprising a capacitor means connected in circuit with said coil for storing energy during one half cycle when current in said coil is reversed and for returning the stored energy to said coil during the next half cycle after the current is reversed thereby increasing the magnitude of the magnetic field established by said coil; and a control pulse generator connected in circuit with said current switching circuit for applying control pulses thereby to reverse cyclically said flow of current.

2. An electrical system as defined in claim 1, wherein said current switching circuit further comprises a first plurality of switching components connected in circuit with said current generator and said coil to effect reversal of direction of current flow through said coil, and a second plurality of switching components connected in circuit with said capacitor means and said coil for alternately opening and closing the circuit of said coil and said capacitor means after flow of current in said coil is reversed.

3. An electrical system as defined in claim 2, further comprising:

a preamplifier means connected in circuit with said electrode means for receiving and amplifying said electrical signals; and a switching means connected in circuit with said preamplifier means and said electrodes for cyclically rendering said preamplifier means nonresponsive to direct current and for cyclically reducing the gain of said preamplifier for short predetermined times after the magnetic field established by said coil is reversed thereby to suppress effects of spurious signals picked up during those times.

4. An electrical system as defined in claim 3, further comprising:

a signal detection means and an output amplifier means connected in circuit with said preamplifier means for detecting and amplifying the desired electrical signals; and a calibrated meter means connected in circuit with said output amplifier to convert the amplified desired signals into direct readings of speed of fluid flow.

5. An electrical system as defined in claim 4, further comprising:

a circuit means interconnecting said control pulse generator with said switching means and said signal detection means to apply selective other control pulses thereto and for cylically activating said preamplifier means and said signal detection means.

6. An electrical system as defined in claim 1, further comprising:

a preamplifier means connected in circuit with said electrode means for receiving and amplifying said electrical signals; and a switching means connected in circuit with said preamplifier means and said electrodes for cyclically rendering said preamplifier means nonresponsive to direct current and for cyclically reducing the gain of said preamplifier for short predetermined times after the magnetic field established by said coil is reversed thereby to suppress effects of spurious signals picked up during those times.

7. An electrical system as defined in claim 6, further comprising:

a signal detection means and an output amplifier means connected in circuit with said preamplifier means for detecting and amplifying the desired electrical signals; and a calibrated meter means connected in circuit with said output amplifier to convert the amplified desired signals into direct readings of speed of fluid flow.

8. An electrical system as defined in claim 7, further comprising:

a circuit means interconnecting said control pulse generator with said switching means and said signal detection means to apply selective other control pulses thereto and for cylically activating said preamplifier means and said signal detection means.

9. An electrical system as defined in Claim 1 wherein said capacitor means comprises two capacitors, one of which is connected to each end of said coil.

* * * * *